A. F. SELIGMAN.
POTATO CLEANER AND SPROUTER.
APPLICATION FILED JAN. 7, 1910.
955,364.
Patented Apr. 19, 1910.
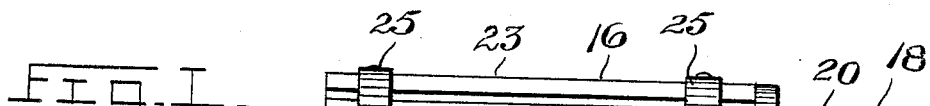

A. F. SELIGMAN.
POTATO CLEANER AND SPROUTER.
APPLICATION FILED JAN. 7, 1910.
955,364.
Patented Apr. 19, 1910.
2 SHEETS—SHEET 2.
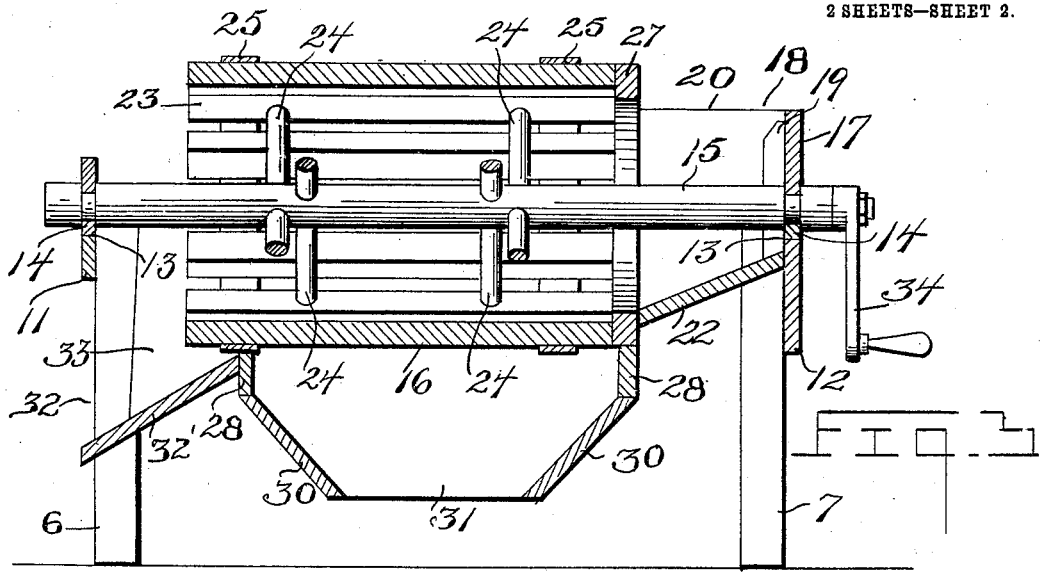
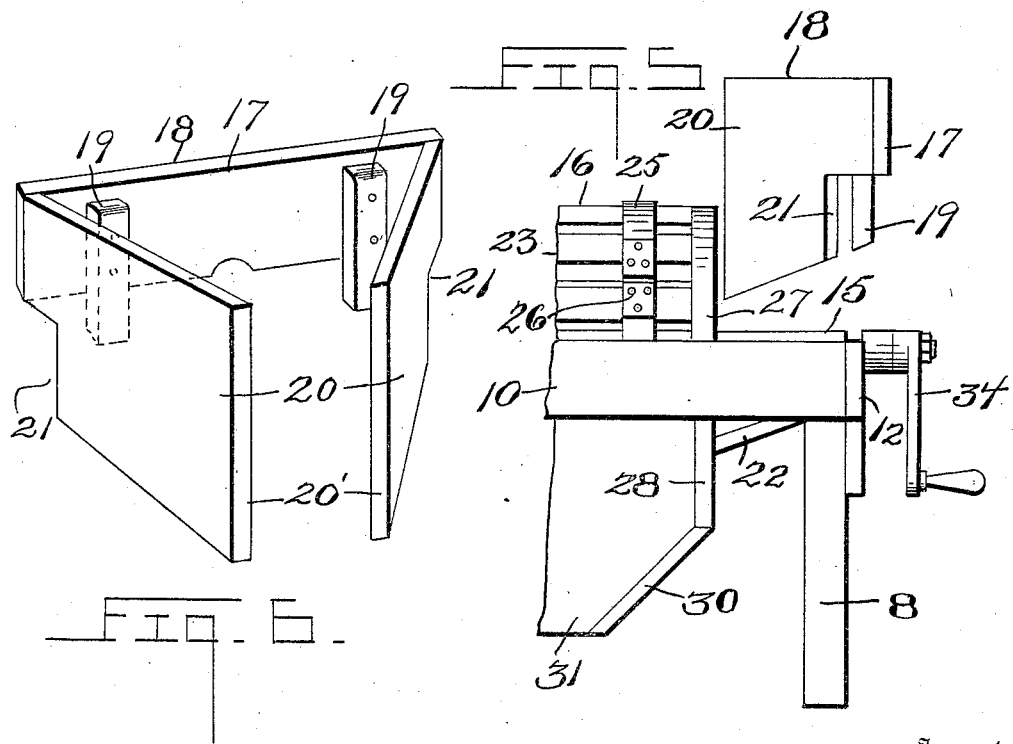
Witnesses
E. E. Johansen
M. L. Lowr.
Inventor
A. F. Seligman.
By Woodward & Chandlee
Attorney

UNITED STATES PATENT OFFICE.

ARTHUR F. SELIGMAN, OF TROY, ILLINOIS.

POTATO CLEANER AND SPROUTER.

955,364.

Specification of Letters Patent. Patented Apr. 19, 1910.

Application filed January 7, 1910. Serial No. 536,886.

*To all whom it may concern:*

Be it known that I, ARTHUR F. SELIGMAN, a citizen of the United States, residing at Troy, in the county of Madison and State of Illinois, have invented certain new and useful Improvements in Potato-Cleaners and Sprouters, of which the following is a specification.

This invention relates to farm apparatus, and more particularly to machines for treating potatoes and similar root foods, which will be simple in structure and arrangement, and by means of which the sprouts may be quickly removed from such foods.
Another and special object is to provide a structure which will be simple and cheap, and which will include a sprout removing cylinder so arranged that it may be easily and quickly removed when desired.
Other objects and advantages will be apparent from the following description, and it will be understood that changes in the specific structure shown and described may be made within the scope of the claim without departing from the spirit of the invention.

In the drawings forming a portion of this specification, and in which like numerals of reference indicate similar parts in the several views, Figure 1 is a side elevation of the present sprout remover, Fig. 2 is a top plan, Fig. 3 is a central longitudinal section on the line 3—3 of Fig. 2, Fig. 4 is a transverse section taken on the line 4—4 of Fig. 2, looking toward the front end board of the receiving hopper, Fig. 5 is a view showing the members of the receiving hopper raised to permit removal of the drum. Fig. 6 is a detail perspective view of the hopper boards.
Referring now to the drawings, the present invention comprises a frame including four legs 5, 6, 7 and 8, the legs 5 and 6 being located at the discharge end of the apparatus, and the legs 7 and 8 being located at the feed end. Parallel longitudinally extending horizontal sills 9 and 10 are secured to the upper ends of the legs, as shown, and transversely extending end sills 11 and 12 are also secured to the upper ends of the legs.

The end members 11 and 12 are recessed in their upper edges as shown at 13 to receive boxes 14 in which there are mounted the ends of a longitudinally extending shaft 15 which carries a drum 16 to be later described. As shown, the upper ends of the legs 7 and 8 lie in the angle formed by the end member 12 and the longitudinal sills 9 and 10, and disposed upon the upper edge of the end member 12 there is an end board 17 of a feed hopper 18. This end board extends across the recess 13, to prevent removal of the shaft 15, and has fastened upon its inner surface a pair of downwardly extending cleats 19, which project over the surface of the end member 12, and rest against the inner faces of the legs 7 and 8. Side walls 20 for the hopper are provided and extend inwardly in convergent relation, as shown and have their outer corners cut away as shown at 21 to fit over the upper ends of the legs 7 and 8.

A downwardly and inwardly slanting bottom board 22 for the hopper is provided, and is secured to the end member 12, extending toward the end member 11, and receiving thereupon the lower edges of the end boards 20 of the hopper. The inner ends of these boards are disposed in spaced relation, as shown, and the drum 16 lies between the inner ends of these boards and the end member 11, as illustrated. The drum consists of a plurality of longitudinally extending spaced slats 23, and certain of the slats are secured to the outer ends of transverse arms 24 which extend through the shaft 15, as shown.

A pair of removable metallic bands 25 are engaged around the ends of the slats just referred to, and secured to the inner faces of these bands, there are a plurality of slats 16′ which are arranged to lie between the slats 16. These slats 16′ are supported only by the bands 25, and thus ample room is permitted for the passage of potatoes between the arms 24. The bands 25 are equipped with detachable connections 26 at their ends, so that these bands may be removed and therewith the slats 16′, to leave enlarged spaces between the slats 23, so that potatoes may be quickly removed from the drum should they become clogged within the latter.

At the end of the drum adjacent to the feed hopper, an annulus 27 is secured against the ends of the slats 23, and the drum is disposed within the annulus against the inner ends of the end walls 20 of the hopper which are beveled as shown at 20′ for the snug fit of the annulus thereagainst. The edge of the bottom 22 is similarly beveled for the same reason. The use of this annulus prevents the catching of potatoes between the ends of the slats and the boards 20.

A pair of transversely extending vertically disposed members 28 are secured to the lower edges of the side members 9 and 10, and have arcuate recesses 28' in their upper edges which receive the lower portion of the drum 16. At the end adjacent to the feed hopper, the annulus 27 fits within the recess 28' of the adjacent member 28, and at the opposite end of the machine one of the bands 25 fits within the recess 28'. Attached to the lower edges of the members 28, there are downwardly converged chute boards 30, and similarly arranged side chute boards 31 are secured to the side sills 9 and 10 and to the members 28 and the boards 30. A discharge chute 32 is located at the end of the drum opposite to the feed hopper, and consists of a bottom board 32' which is secured at one end to the adjacent member 28 and is slanted downwardly and outwardly and secured at its outer edge between the legs 5 and 6. Side boards 33 are secured at their upper ends to the side members 9 and 10 and slant downwardly and inwardly to be secured upon the board 32', and rest with their side edges against the adjacent member 28. An operating crank 34 is carried by the end of the shaft 15 which lies adjacent to the feed hopper, and the shaft may thus be revolved to carry therewith the drum 16.

Potatoes to be treated are dropped into the hopper from which they pass into the drum through the opening in the annulus 27, and move about within the drum as the latter is rotated, until they pass from the opposite end of the drum through the chute 32. While in the drum, all foreign matter and all sprouts upon the potatoes are broken off by engagement of the potatoes with each other and by their engagement with the slats of the drum, and these particles fall between the slats and pass out through the chute formed by the elements 30 and 31 above described. When it is desired to remove the drum, the boards 17 and therewith the end boards 20 are raised, and the shaft may then be lifted from its boxes. The cleats 19 fit snugly against the inner face of the end member 12 and between the upper ends of the legs 7 and 8, thus holding the portions in removable position.

What is claimed is:

In a potato cleaning and sprout removing apparatus, the combination with a frame, of supporting legs for the frame, a shaft journaled in the frame, arms carried by the shaft and extending laterally therefrom, slats carried by the ends of the arms, detachable bands engaged around the ends of the slats, additional slats carried by the inner faces of the bands and lying between the first named slats, an annulus secured to the ends of the first named slats, said annulus surrounding the shaft, a feed hopper arranged to direct potatoes through the annulus and into the inclosure of the slats, a hopper located in position to receive refuse matter through the spaces between the slats, and a discharge chute arranged to receive potatoes from within the inclosure of the slats at the opposite end from the feed hopper.

In testimony whereof I affix my signature, in presence of two witnesses.

ARTHUR F. SELIGMAN.

Witnesses:
   CHAS. E. SELIGMANN,
   A. HEDDERGOTT.